United States Patent [19]

Yanagi

[11] 4,449,447
[45] May 22, 1984

[54] BRAKE PISTON OF DISK TYPE

[75] Inventor: Kouichiro Yanagi, Hanyu, Japan

[73] Assignee: Akebono Brake Industry Company, Ltd., Tokyo, Japan

[21] Appl. No.: 263,054

[22] Filed: May 13, 1981

[30] Foreign Application Priority Data

May 20, 1980 [JP] Japan .................. 55-66671

[51] Int. Cl.³ .............................................. F16J 1/00
[52] U.S. Cl. ................................. 92/248; 188/264 G
[58] Field of Search ............... 92/248, 212, 213, 172, 92/222, 224; 188/264 G; 264/273

[56] References Cited

U.S. PATENT DOCUMENTS

| 3,152,523 | 10/1964 | Whitfield et al. | 92/213 |
| 3,398,222 | 8/1968 | Kaufman, Jr. et al. | 264/273 |
| 4,170,926 | 10/1979 | Emmett | 92/248 |
| 4,327,820 | 5/1982 | Nakayama et al. | 92/248 |

FOREIGN PATENT DOCUMENTS

| 2854247 | 6/1980 | Fed. Rep. of Germany | 188/264 G |
| 1308438 | 2/1973 | United Kingdom . | |

Primary Examiner—Abraham Hershkovitz
Assistant Examiner—Richard L. Klein
Attorney, Agent, or Firm—Armstrong, Nikaido, Marmelstein & Kubovcik

[57] ABSTRACT

This invention relate to an improvement of the resinous brake piston of disk type, particularly the synthetic thermosetting resin piston of disk type whose opening end is thermally reinforced by simultaneous casting of the heat-resistant material, so as to prevent the crack in the opening end of the piston even when it comes into direct contact with the back metal of the friction pad of high temperature in the disk brake.

1 Claim, 14 Drawing Figures

BRAKE PISTON OF DISK TYPE

DETAILED DESCRIPTION OF THE INVENTION

The present invention relates to a resinous piston for the brake of disk type of which the opening end or the surface in contact with the back metal of the pad is prevented from the generation of crack because of exposure to high temperature.

Though the synthetic thermosetting resin piston is generally employed in the conventional brake of disk type, when the opening end of piston comes into direct contact with the back face of the friction pad of high temperature at the time of working of the brake, the resulted heating impact often causes the crack harmful for the material of piston.

The present invention has the object of remedying the mentioned drawback whereby the heat transmission from the friction pad to the opening end of the piston is mitigated to prevent the crack in the raw material for the piston.

Furthermore, according to the present invention the seal rubber of the piston is advantageously prevented from thermal deterioration and vapor lock.

Examples of the heat-resisting material employable for the execution of the present invention include a ceramic ring composed of sintered ceramics (porous) of the powder of silicon carbide etc. impregnated with polyimide resin or phenol resin etc., a sintered alloy ring composed of sintered porous material from the powder of Fe—Cu or Fe—Pb etc. impregnated with polyimide resin or phenol resin etc., a perforated plate ring of steel, copper, stainless steel or glass perforated numerously with equal intervals along the peripheral direction of annular plate and a cloth ring of the fibers of steel, copper, stainless steel, glass and the carbon fibers woven annularly and impregnated with polyimide resin or phenol resin.

The present invention is described with reference to the examples represented by the attached drawings herewith.

Figure 1A:
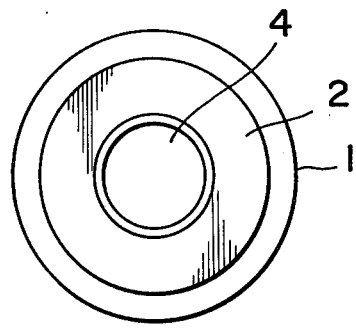
FIGS. 1(A) and 1(B) are respectively the plan and cross section of the conventional brake piston of disk type.
Figure 1B:
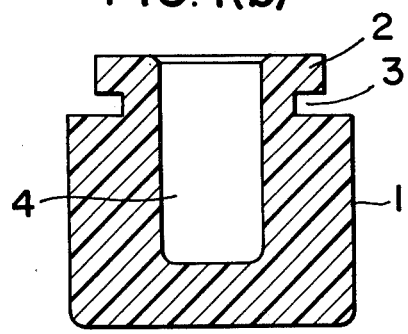

In FIG. 1 there is shown a conventional resinous brake piston of disk type employing the matrix of thermosettng resin. Numeral 1 denotes a piston body, 2 the opening end of the piston, 3 the groove for fitting with the piston seal between the piston body 1 and the opening end 2 of the piston, and 4 the hollow of the piston.

EMBODIMENT EXAMPLES

Example 1

Figure 2A:
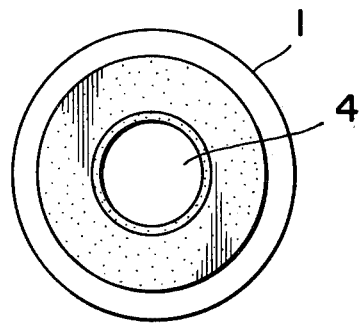
FIGS. 2(A) and 2(B) are respectively the plan and cross section of the brake piston in Example 1 of the present invention.
Figure 2B:
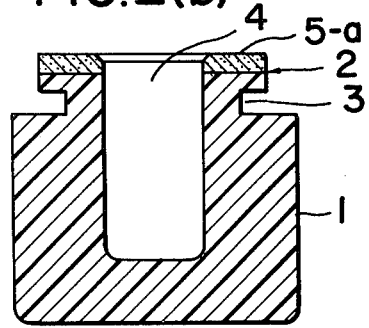

As shown in FIG. 2, the thickness-showing top plane of the opening end (2) of the resinous piston is made of a heat-resistant material and is simultaneously and incorporatedly molded with the piston to form a heat-resistant ring (5-a).

Then, it is advantageous to increase the sealing force between the ring and the piston body that the heat-resistant ring which is, for instant, made of metal is applied with a bonding agent such as phenol resin etc. on the sealing face thereof, prior to molding the two.

Example 2

Figure 3:
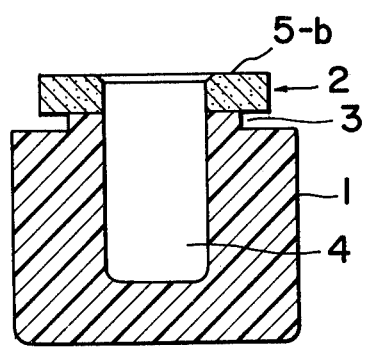
FIGS. 3 and 4 are the cross sections for Examples 2 and 3 of the present invention.

In FIG. 3, the whole thickness-showing plane of the opening end (2) of the resinous piston is simultaneously and incorporatedly molded with the piston to form the heat-resistant opening end (5-b).

Example 3

Figure 4:
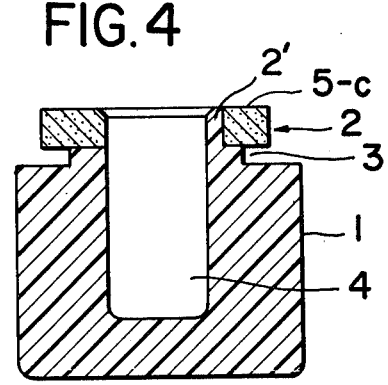

In FIG. 4, the opening end (2) of the resinous piston except the teeth (2') is molded incorporatedly with the piston body under condition of fitting with the heat-resistant opening end (5-c) having internally the tooth groove.

Example 4

Figure 5A:
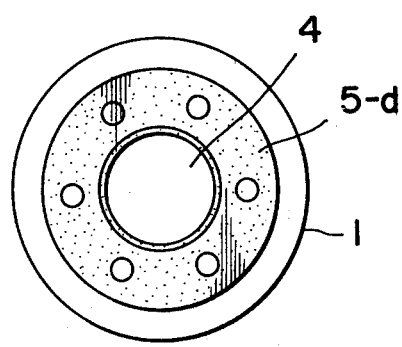
FIGS. 5(A) and 5(B) are respectively the plan and cross section for Example 4 of the present invention.
Figure 5B:
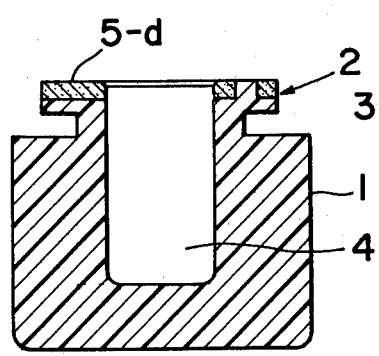

In FIG. 5, a perforated heat-resistant ring (5-d) having six holes equally spaced peripherally is incorporatedly molded with the piston body under condition of fitting to the top surface of the opening end (2) of the resinous piston.

Then, these holes are useful for degasing in the process at molding the ring and piston body.

Example 5

Figure 6A:
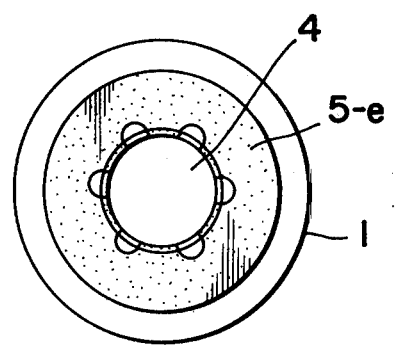
FIGS. 6(A) and 6(B) are respectively the plan and cross section for Example 5 of the present invention.
Figure 6B:
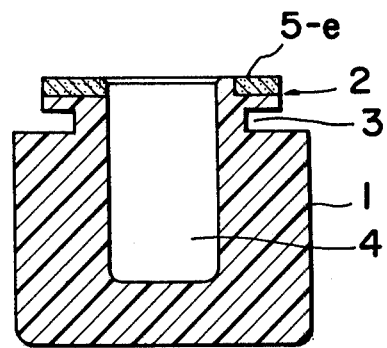

In FIG. 6, a heat-resistant ring (5-e) having the tooth groove peripherally is molded incorporatedly with the piston body under condition of fitting to the top surface of the opening end (2) of the resinous piston.

Example 6

Figure 7A:
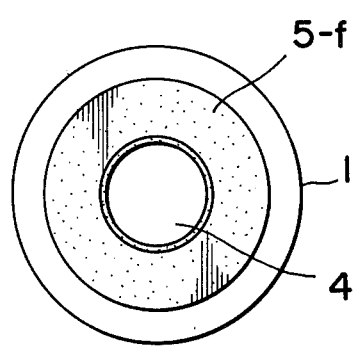
FIGS. 7(A) and 7(B) are respectively the plan and cross section for Example 6 of the present invention.
Figure 7B:
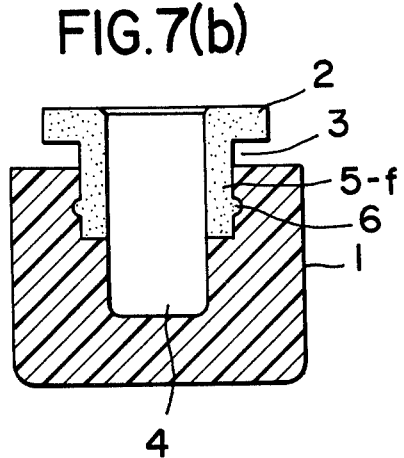

In FIG. 7, a resinous piston body (1) having a cylindrical dent is molded incorporatedly with the heat-resistant ceramic and flanged cylinder (5-f), said flange of cylinder (5-f) being in contact with the opening end (2) of the piston of the former examples. The groove (3) for fitting to the piston seal is arranged between said flange and piston body (1).

The upper half of inner periphery of piston body (1) is partially cut away by the thickness of the cylinder (5-f), where is fitted with the cylinder (5-f). Both fitting surfaces have previously respective peripheral engagement grooves (6).

Example 7

Figure 8A:
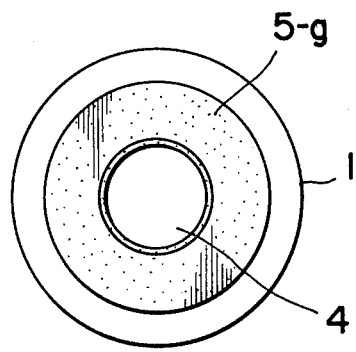
FIGS. 8(A) and 8(B) are respectively the plan and cross section for Example 7 of the present invention.
Figure 8B:
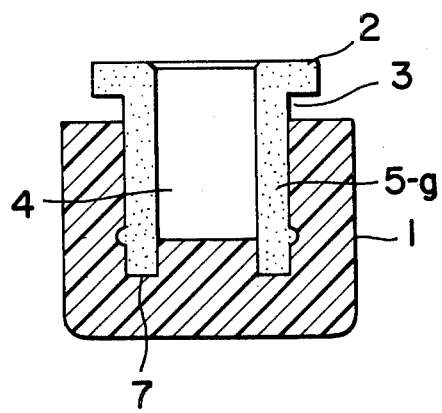

In FIG. 8, an annular fitting groove (7) is arranged in the bottom of the hollow (4) of the resinous piston body (1). When the heat resistant ceramic and flanged cylinder (5-g) is fitted to the piston body (1), the bottom end of said cylinder (5-g) is fitted to said annular groove (7) and molded incorporatedly to form a piston.

Other details are similar to those of FIG. 7.

"High temperature fade tests" are executed with our automobile to evaluate the effect of the present invention.

TEXT EXAMPLE 1

A conventional product comprising the resinous piston having a matrix of thermosetting resin as shown in FIG. 1, a product (I) of the present invention applied with the carbon fiber cloth ring as heat-resistant material to the resinous piston body as shown in FIG. 6, a product (III) of the present invention applied with the ceramic ring, and a product (II) of the present invention applied with the perforated steel plate ring, are tested to determine the temperature (°C.) of each part at the time of "high temperature fade test". The results are shown in Table 1.

TABLE 1

| | | Back metal of pad | Piston | | | Liq. temp. |
|---|---|---|---|---|---|---|
| | Rotor | | Opening end | Part in contact with seal | Bottom end | |
| Convnt'l product | 600 | 490 | 380 | 155 | 105 | 95 |
| Invent'l product I | 600 | 489 | 390 | 145 | 103 | 93 |
| Invent'l product II | 600 | 485 | 390 | 140 | 102 | 90 |
| Invent'l product III | 600 | 490 | 390 | 130 | 97 | 85 |

It is found, from the above results of determination of temperature in each part of the brake, that the part opposite to the seal is heated to a maximum of 145° C., while the critical temperature of heat resistance of seal material is lower than 150° C., and then the thermal deterioration of seal material can be prevented.

TEST EXAMPLE 2

A conventional product (A) comprising a steel piston having the structure as shown in FIG. 1, a conventional product (B) comprising a resinous piston, and a product (IV) of the present invention applied to the resinous piston body with the flanged cylindrical ceramics as shown in FIGS. 7 and 8, are tested to determine the critical temperature (°C.) of each part at the time of "high temperature fade test". The results are shown in Table 2.

TABLE 2

| | | Back metal of pad | Piston | | | Liq. temp. |
|---|---|---|---|---|---|---|
| | Rotor | | Opening end | Part in contact with seal | Bottom end | |
| Convent'l product (A) | 600 | 470 | 330 | 220 | 220 | 185 |
| Convent'l product (B) | 600 | 490 | 380 | 105 | 105 | 95 |
| Invent'l product (IV) | 600 | 495 | 390 | 95 | 95 | 85 |

From the above results of determination of the temperature in different parts of the brake, it is found that the part opposite to the seal is heated to a maximum of 145° C., while the critical temperature of heat resistance of seal material is lower than 150° C., and then the thermal deteriration of seal material can be prevented.

As will be understood from the determination of the liquid critical temperature, the products (1)-(IV) of the present invention warrant the safe driving of automobile even under as hard conditions as possible for said test automobile, if the found temperature is lower than the boiling point of the brake liquid.

In the case of employing the ceramics as heat resistant material, the ceramics having excellent thermal and mechanical characteristics such as $0.1 \times 10^{-3}$ cal/cm.°C. in the heat transfer coefficient, $2.3 \times 10^4$ kg/mm$^2$ in Young's modulus of sintered material, $5-50 \times 10^{-7}$ cm/°C. in the heat expansion coefficient and having a smaller density of 2.8 are preferable for executing the present invention.

What is claimed is:

1. Brake piston of disk type comprising a piston body made of resinous material and having an opening end, a circumferential seal groove adjacent said opening end, and a hollow interior, characterized in that an annular heat resisting ring is joined to said opening end by simultaneous casting, said ring has a plurality of perforations extending axially of the piston body, said opening end has formed thereon by said simultaneous casting a plurality of protrusions filling said perforations, and said ring is made of a material selected from the group consisting of a ceramic, a sintered alloy, steel, and woven carbon fiber.

* * * * *